United States Patent [19]

Block

[11] Patent Number: 4,894,149

[45] Date of Patent: Jan. 16, 1990

[54] BIOLOGICAL FILTRATION DEVICE

[76] Inventor: Steven J. Block, 9368 Oakwilde Ave., Stockton, Calif. 95212

[21] Appl. No.: 245,169

[22] Filed: Sep. 16, 1988

[51] Int. Cl.$^4$ ............................................. B01D 27/02
[52] U.S. Cl. .................................... 210/101; 210/169; 210/220; 210/253; 210/258; 210/260; 210/264; 210/266; 210/290; 210/416.2; 210/437
[58] Field of Search .................. 55/485; 210/150, 169, 210/196, 253, 258, 260, 266, 275, 277, 278, 284, 288, 290, 416.2, 436, 437, 443, 458, 285, 316, 420, 422, 428, 457, 101, 220, 264

[56] References Cited

U.S. PATENT DOCUMENTS

| | | | |
|---|---|---|---|
| 3,021,954 | 2/1962 | Allen | 210/253 |
| 3,088,592 | 5/1963 | Clark | 210/253 |
| 3,167,399 | 1/1965 | Hansen, Jr. | 422/217 |
| 3,266,628 | 8/1966 | Price | 210/288 |
| 4,212,743 | 7/1980 | Van Meter et al. | 210/288 |
| 4,266,412 | 5/1981 | Merenda | 210/437 |
| 4,421,643 | 12/1983 | Frederick | 210/169 |
| 4,517,084 | 5/1985 | Pincon | 210/416.2 |
| 4,555,334 | 11/1985 | Cohen | 210/169 |
| 4,643,836 | 2/1987 | Schmid | 210/795 |
| 4,704,202 | 11/1987 | Payner | 210/416.2 |

Primary Examiner—Richard V. Fisher
Assistant Examiner—Wanda L. Millard
Attorney, Agent, or Firm—Dennison, Meserole, Pollack & Scheiner

[57] ABSTRACT

A filtration device is disclosed comprising an assembly of three concentric tubular members in longitudinal upright position, having a closure wall at each end, the inner and middle tubular members being perforated over substantially their entire length to permit water flow therethrough, and the outer tubular member being substantially solid over its entire length. An inlet is connected to the inner tubular member at each end, and an outlet is connected to the outer tubular member. The space between the inner tubular member and the middle tubular member is a filtration chamber containing a filtration medium. A dividing device is laterally positioned in the inner tubular member dividing it into upper and lower non-communicating portions, and a dividing device is also laterally positioned in the filtration chamber dividing it into upper and lower non-communicating filtration chambers. The filtration medium is adapted to not pass through the perforations of the inner and middle tubular members. Additional dividing devices may be located in the upper and lower filtration chambers, in order to divide them into chambers of a size approximately 1 cubic foot. The filtration device of the invention is especially useful as a biological filter used in aquaculture systems, and as a pre-biological filter for removal of suspended matter.

21 Claims, 2 Drawing Sheets

BIOLOGICAL FILTRATION DEVICE

BACKGROUND OF THE INVENTION

1. Field of the Invention

The invention relates to a filtration device, especially one for maintaining the quality of water in a closed loop or semi-closed loop aquaculture system.

2. Description of the Prior Art

There has been increasing interest of late in the cultivation of fish, both by the commercial farmer interested in providing fish for food, and by the hobbyist raising such fish as Koi for their beauty. While such aquaculture can take place in naturally occurring bodies of water, this is geographically limiting and requires a source of water free of contaminants which is of the proper temperature and composition for the particular fish being cultivated. Moreover, this method is generally unacceptable for adequate viewing of fish which are raised for their aesthetic value.

In the cultivation of fish and seafood, it is far more efficient to use a closed loop or semi-closed loop system in which the fish are cultivated in a tank with the water recirculated and purified. This enables fish to be cultivated long distances from suitable bodies of water and limits the amount of fresh water must be added to the system.

The use of a closed or semi-closed system requires constant filtration and treatment of the water to enable those conditions which will allow the fish to survive and flourish. Filtration of the water associated with the closed system involves both a physical filtration to remove solid matter from the water as well as treatment which will remove dissolved chemical contaminants from the water. The waste products of fish ultimately generate ammonia which is highly toxic to fish and other aquatic animals. In a closed or semi-closed system, it is therefore necessary to provide a means for removing ammonia and other nitrogenous wastes from the water. Generally, this involves culturing aerobic bacteria which utilize nitrogenous wastes in their nutritional cycle, and convert these wastes to substantially less toxic compounds. While creation of these bacterial colonies has been efficiently accomplished in the small "fish tank" type filtration systems, problems exist in attempting to apply these principles to larger systems which may contain thousands of gallons of water and are exposed to the elements.

For healthy growth of aquatic aerobic bacterial colonies, a number of conditions must be met. An adequate oxygenation of the water is crucial, since these organisms are oxygen dependent. Closely related to this is adequate flow rates of water since stagnation of water through a filtration medium will result in oxygen depletion and will encourage the growth of anaerobic bacteria which are hazardous to the health of the fish. Channeling of the water in the filter results in the exclusion of aerated water from certain regions within the filter with the formation of dead spaces which encourage anaerobic bacterial growth.

Under appropriate conditions, aerobic bacteria will colonize a variety of media. Generally, the greater the surface area exposed to adequate flow rates and thus adequate levels of oxygen, the greater the number of colonies in a given volume of media. A given volume of sand, for example, will theoretically accommodate a larger number of bacterial colonies than the same volume of stones or crushed rock, since the sand provides a larger surface area. The problem in applying this principle is that the smaller the diameter of the particulate media, the more difficult it is to provide an even flow, prevent channeling and keep the media functionally clean.

The regions of the media which first receive the inflowing water with highest oxygen saturation are the areas with the maximum number of colonies. In fact, the greatest portion of the bacterial activity in a downflow filtration device is actually at the surface of the filter in close association with detritus which is often flushed away when conventional filters are backflushed.

When designs have been proposed in the art for biological filters to be used in aquaculture. For example, U.S. Pat. Nos. 3,973,519 and 3,957,017 utilize a filter in which water flows upwardly into a cylinder containing a porous medium through a perforated plate. Water flowing to the filters is aerated at the base of the filter.

U.S. Pat. No. 3,661,262 describes a biological filter in which the water flows downwardly through a bed of sand and shells supported by a water-permeable substrate mesh or framework which permits the water to drain therethrough by gravity.

U.S. Pat. No. 3,662,889 discloses a filter which is actually immersed in a pond of water and which includes perforated concentric cylinders containing a filtration medium therebetween. The water flows inwardly through the filtration medium to the inner cylinder from which it is pumped upwardly and outwardly.

In the use of the above biological filters, one of the problems which exists is in cleaning the filter. U.S. Pat. No. 3,662,889 specifically discloses cleaning the filter by disassembling the device and detaching the filter material. In many cases, the filter can be cleaned by simply backflushing. However, in both cases, the cleaning process results in the loss of many of the bacterial colonies and the necessity for reestablishing these bacterial colonies. It has been proposed, in fact, to utilize two entirely separate, independently functional filtration systems which can be backflushed at different times, to minimize bacterial colony loss.

SUMMARY OF THE INVENTION

It is therefore an object of the invention to provide a bacterial filter for aquaculture with a reduced need for cleaning.

It is another object of the invention to encourage maximal growth of aerobic bacterial colonies within the smallest space possible while discouraging the growth of anaerobic bacterial colonies through the adverse effects of channeling.

It is another object of the invention to promote the efficient aerobic bacterial consumption of toxic nitrogenous wastes.

It is a further object of the invention to provide a bacterial filter which can be backflushed with a minimal loss of beneficial aerobic bacterial colonies.

To achieve these and other objects, the present invention provides a filtering device comprising:

an assembly of three concentric tubes or cylinders having a closure wall at each end, in longitudinal upright position, the inner and middle cylinders being perforated over substantially their entire lengths to permit water flow therethrough, and the outer cylinder being substantially solid or imperforate over its entire length;

inlet means connected to the inner cylinder at each end thereof;

outlet means connected to the outer cylinder;

a filtration medium in the space between the middle cylinder and the inner cylinder defining a filtration chamber; and dividing means dividing the inner cylinder into upper and lower non-communicating portions, and dividing the filtration chamber into upper and lower non-communicating portions.

The filter of the invention is perferably based on concentric cylinders, in order to promote uniform flow through the filter chambers. However, other tubular members which also allow substantially uniform flow can be utilized.

The filter of the invention is connected so that a portion of the inflow water flows to the inlet at the top of the filter and another preferably equal portion of the inflow water flows to the inlet at the bottom of the filter. The water travels from the inner to the outer filter portion, through the filter medium.

The division of the inlet flow water into two portions serves two purposes. First, providing two different pathways for the incoming water diminishes the likelihood of obstruction or channeling which could incapacitate the filter's bacterial function. Second, it provides a method for cleaning the filter bed which minimally disturbs the media and avoids the need for disassembling the device. In this cleaning method, half the filter bed receives double the normal volume of water while operating in a normal mode, while simultaneously, twice the normal volume of water is directed through the other part of the filter bed in the opposite direction. This method allows dislodged colonies of bacteria to pass through the other half of the filter in the opposite direction to normal flow with the likelihood that at least some colonies will reseed in the media. Half of the filter will receive a double volume of water in the same direction as normal flow with even less disruption of its bacterial colony integrity. Thus, this filter construction eliminates the need for two entirely separate filtering systems which is often recommended to preserve bacterial activity when cleaning a filter.

The preferred filter medium used in this device is quarter inch gravel from a desert source. Other filter media which may be used include other types of gravel, and ceramic materials. The only requirements of the media are that it will not decompose or deteriorate in use, that it lends itself to cleaning by backflushing and that it is of a size which will contain it within the confines of the inner and middle perforated cylinders.

In a preferred embodiment of the invention, one or more dividing discs are placed laterally between the inner and middle cylinders, thus creating a series of filtration chambers of substantially equal volume; for example, each of volume of approximately 1 cubic foot. Normally, one dividing disc is placed in the upper portion and one is placed in the lower portion, thus creating four filtration chambers. These additional disc dividers do not extend through the inner cylinder, which is divided into two sections by a central divider.

DESCRIPTION OF THE PREFERRED EMBODIMENTS

Figure 1:
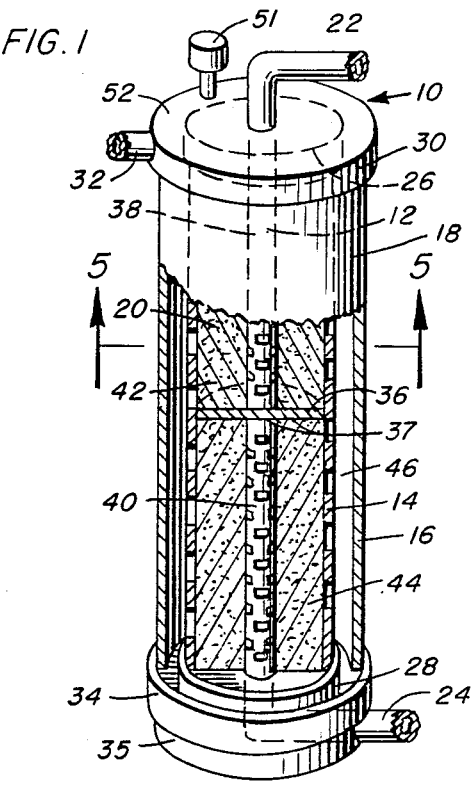
FIG. 1 shows a filter according to the invention in cutaway perspective view.
Figure 5:
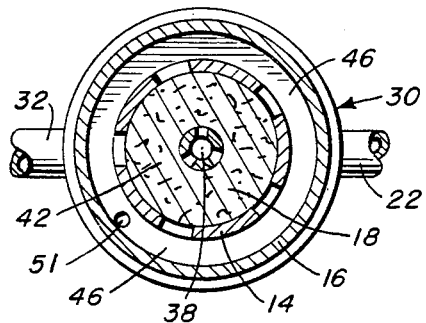
FIG. 5 is a cross-sectional view along line 5—5 of FIG. 1.

As shown in FIG. 1, a filter 10 according to the invention includes a central core 12, a perforated filter sheath 14, and an external non-perforated sheath 16. The space between central core 12 and perforated filter sheath 14 comprises a filtration chamber 18 containing a filtration medium 20, such as sand or gravel. The perforations in central core 12 and filter sheath 14 are sufficiently small so that the filtration media will not pass through.

Two inlets are connected to the central core, an upper inlet 22 and a lower inlet 24. The filtration chamber 18 is closed off at its upper end with a cap 26 and at its lower end with a cap 28. Filter 10 is closed at its upper end with a cap 30, having therein an outlet 32, and an overpressure relief valve 51. Cap 34 closes off the filter at its lower end. The filter rests on stand 35.

A divider 36 is provided centrally in the filter extending laterally across the filtration chamber and a divider 37 divides the central core 12. The divider 37 divides the central core into two non-communicating portions 38 and 40 and divider 36 divides the filtration chamber 18 into two non-communicating portions 42 and 44. Both the upper and lower portions of the filtration chamber communicate with an outer chamber 46 which communicates with outlet 32.

Figure 2:
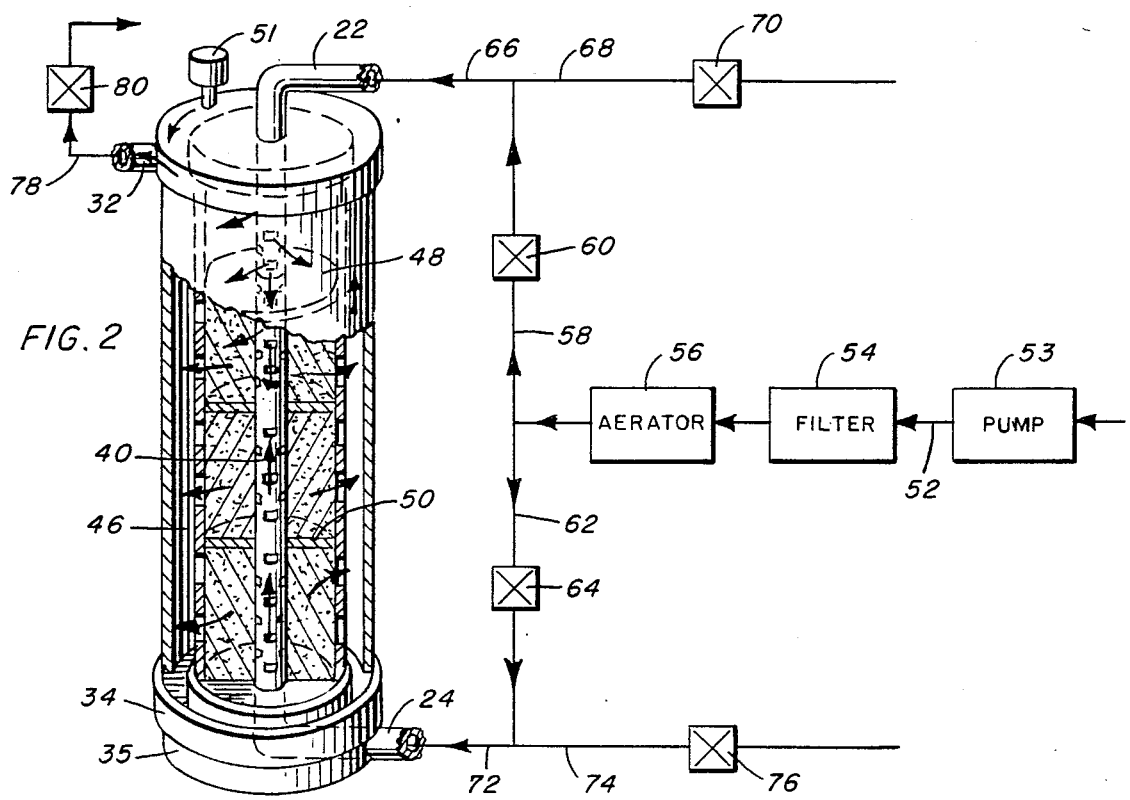
FIG. 2 shows a modification of the filter shown in FIG. 1, additionally showing schematically the direction of water flow in filtering mode.

In a preferred embodiment of the invention shown in FIG. 2, two additional disc dividers 48 and 50 are provided, divider 48 dividing filtration chamber 42 into upper and lower portions, and disc 50 dividing filtration chamber 44 into upper and lower portions. Each filtration chamber portion is about 1 cubic foot in volume. It is noted that disc dividers 48 and 50 do not extend through the central core 12 which is divided only by the central divider 37.

FIG. 2 shows schematically the connections and flow of the filter of the invention in normal filtration mode. Water from a pond or tank is removed through line 52 by pump 53 and passes through a pre-biological filtration device 54, which may be the filtering device of the invention, altered to accommodate a smaller size gravel, sand or other medium, or which may be a conventional sand filter, to remove particulate matter from the water. The water then passes through an aerator 56. After exiting the aerator, the water line 52 is split into two lines, a first line 58 having a valve 60 and a second line 62 having a valve 64. Valves 60 and 64 can be adjusted for approximately equal water flow through lines 58 and 62 which can be monitored by flow gauges.

Each of the lines 58 and 62 is then divided into two branches. Line 58 is divided into a line 66 connected to one input of the filtration device and into another line 68 with valve 70. Lines 62 is divided into a line 72 connected to another input of the filtration device and a line 74 having a valve 76. Lines 68 and 74 are used for backflushing, and in normal filtration mode valves 70 and 76 are closed so that there is no water flow through lines 68 and 74.

Thus, in operation of the filter, inflow water enters the filter through inputs 22 and 24 and flows outwardly through the perforations in each half of the central core. The water flows through the gravel in the filtration chambers and through the perforations in each half of the filter sheath to space 46 where the water flows upwardly to outlet 32. The water then flows through line 78 and open valve 80 back to the pond or tank.

Figure 3:
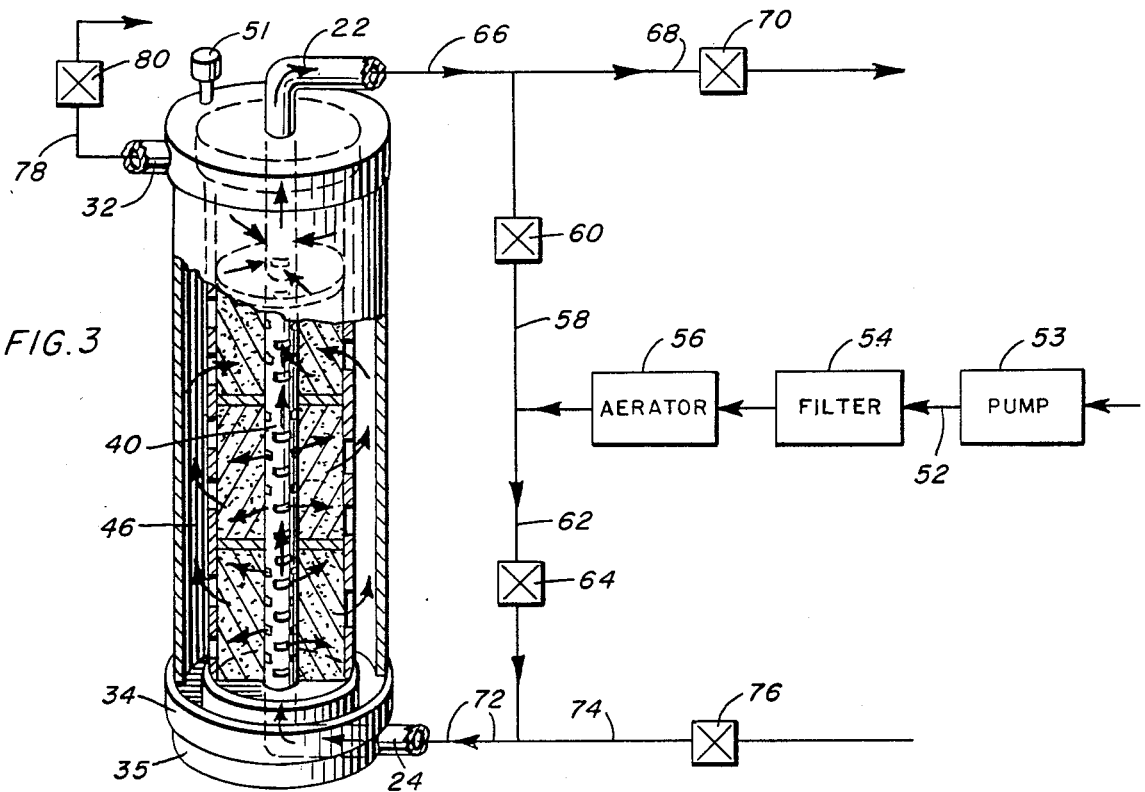
FIG. 3 shows the filter of FIG. 2, schematically showing direction of water flow in a first backflushing mode.

Operation of the filter in a first backflush mode is shown in FIG. 3. In this mode, valve 70 is opened while valves 60 and 80 are closed. Because valve 60 is closed no water flows through line 58, and because valve 80 is closed, no water flows through the return line back to the pond or tank. Thus, water from the pond or tank flows entirely through lines 52, 62 and 72 through filter input 24, doubling the volume of water normally passing through the lower section of the filtration device, assuming adequate pressure. This water is filtered in the normal manner in the lower section of the filter, but cannot pass to outlet 32 because valve 80 is closed. Therefore, the water flows in a reverse direction through the upper section of the filter, passing through the filtration chambers in the reverse direction to the upper portion of the central core. The water then flows outwardly through what is normally an inlet, 22, and through line 66, line 68 and valve 70 to a drain, not shown.

This embodiment for backflushing is highly advantageous, in that any bacterial colonies washed out of the lower portion of the filter (normal flow direction maintained) have an opportunity to reestablish themselves in the upper portion of the filter, before the water carrying them passes to the drain. Because only one-half of the filter is backflushed at any one time, many bacterial colonies are preserved in the section of the filter with normal flow direction. Moreover, backflushing utilizing the filtration device of the invention does not require mechanical agitation of the filtration medium which will further preserve the integrity of bacterial colonization of the media.

Figure 4:
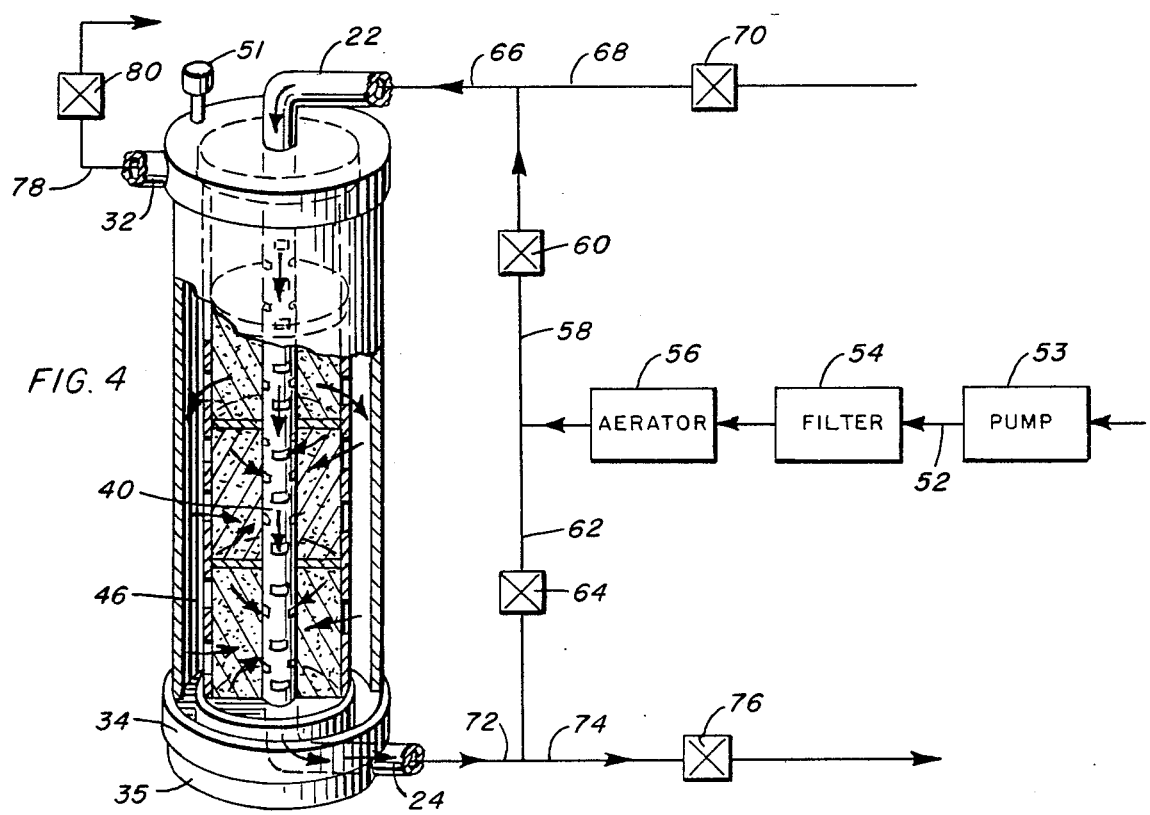
FIG. 4 shows the filter of FIG. 2, schematically showing water flow in a second backflushing mode.

Another backflushing embodiment is shown in FIG. 4. In this embodiment, valves 60 and 76 are opened, while valves 64, 70 and 80 are closed. In this manner, input water flows through lines 52 and 58, through valve 60, and through line 66 to input 22. The water passes through the upper portion of the central core and outwardly through the gravel to the outer chamber. Since outlet valve 80 is closed, the water must flow back through the lower portions of the filtration chamber to the central core and out through what is normally inlet 24. The water then flows through line 72 and 74, through valve 76 to the drain. Because valve 64 is closed, no water flows through line 62.

Thus, the lower portion of the filtration chamber is backflushed in essentially the same manner as the upper portion of the filtration chamber. Bacterial colonies washed out of the upper portion must pass through the lower portion and have an opportunity to reseed.

The minimum recommended water flow through the filter of the invention is one to three gallons per minute per cubic foot of gravel with three gallons per minute representing the preferred minimum. A lower water flow tends to result in channeling, and the growth of anaerobic bacteria in sections of the gravel which do not receive adequate amounts of water. The maximum water flow is not fixed, but will depend on the capacities of the components involved in construction. A flow of 10 to 12 gallons per minute per cubic foot of gravel has been commonly used. Overpressure relief valve device 51, installed at the top of the top cap of the filter, releases pressure if it exceeds a predetermined amount.

The frequency of backflushing will depend on the condition of the aquacultural environment, the size of filtration media and the water flow through the filter. Backflushing should take place whenever the water flow through the filter is reduced below three gallons per minute per cubic foot of filtration meduim. If the recommended pre-filter is used to remove debris, it may be necessary to backflush the pre-filter from once or twice daily to as infrequently as once in several days or longer. This presents no problem to the balance of the aquaculture, since the pre-filter is not used primarily for its biological activity. By frequently backflushing the pre-filter, it will be necessary to backflush the biological filter much less often. If the device of the invention is modified to function as a pre-filter, the biological filter may require backflushing as infrequently as once in several months or longer, particularly once a balanced ecology is obtained. If a pre-filter is not used, it will be necesssary to backflush the biological filter considerably more often.

EXAMPLE

A filter is constructed according to the embodiment shown in FIG. 2. The central core 12 is made of PVC pipe, 2 inches in diameter and approximately $49\frac{1}{2}$ inches long, having a series of lateral slots 3/32 inch in width and $1\frac{7}{8}$ inches long, with three slots per circumference with a $\frac{1}{2}$ slot gap between them. Each row of slots is $1\frac{1}{2}$ inches apart.

When the device is to be utilized primarily as a mechanical pre-biological filter, filtering unit, the lateral slot width and the $\frac{1}{2}$ inch slot gap can both be reduced to accommodate the smaller filtration medium and yet provide adequate flow rates.

The external gravel sheath 14 is also PVC (63 PSI), 15 inches in diameter and approximately $49\frac{1}{2}$ inches long, also having slots 3/32 inch in width, 5 slots per circumference.

The external non-perforated sheath is 18 inch diameter PVC (63 PSI), and the top and bottom caps are PVC (100 PSI) as well.

The central core is obstructed at its mid point by a cemented PVC disc 37.

The filtration chamber 18 is filled with $\frac{1}{4}$ inch diameter gravel from a desert source to a depth of approximately 12 inches. A close fitting Neoprene disc is then placed in the filtration chamber on top of the gravel and filling continues until another 12 inches of gravel is added. At this point, the mid point of the filter has been reached and a Neoprene disc corresponding to disc 36 is placed on top of the gravel. Filling continues to another 12 inches in depth and a Neoprene disc corresponding to disc 48 is placed on top of the gravel, followed by filling until the top of the filtration chamber is reached. The Neoprene discs are held tightly in place by the weight of the gravel and create a series of filtration chambers approximately 1 cubic foot in volume, which do not communicate directly with each other, but share access to the outer circumferential chamber 46.

Connection to the filtration device of the example is made utilizing standard PVC pipe and valves. While many variables such as sun exposure, pond depth and water chemistry affect the function of the filtration device shown in the example, the four cubic foot device, with the recommended flow rates should, under average circumstances, adequately biologically filter a 7,500 gallon pond or tank exposed to direct sun, or a 15,000 gallon shaded pond or tank.

The aerator, relief valve and sand filter may be typical commercially available devices, though the device of the invention modified to accommodate a filtration media of smaller particle size, is preferred as the pre-filtering device. The aeration device may be a diaphragm aerator in which air is pumped through an air stone into the water being treated. the aerator can be located in any position so long as it is ahead of the biological filter, though the preferred position is as close to the water inflows 22 and 24 as possible.

What is claimed is:

1. A filtration device comprising:
   an assembly of three concentric elongated tubular members adapted for use in a generally vertical position, having a closure wall at each end, the inner and middle tubular members being perforated over substantially their entire lengths to permit water flow therethrough, and the outer tubular member being substantially imperforate over its entire length;
   a first inlet means communicating with the interior of said inner tubular member at one end thereof, and a second inlet means communicating with the interior of said inner tubular member at the other end thereof;
   outlet means communicating with the interior of said outer tubular member;
   a filtration medium in the space between said middle tubular member said inner tubular member defining a filtration chamber, the perforations of said inner and middle tubular members not passing said medium therethrough; and
   dividing means laterally dividing said inner tubular member into upper and lower non-communicating portions and laterally dividing said filtration chamber into upper and lower non-communicating filtration chambers.

2. A filtration device according to claim 1, additionally comprising a further dividing means laterally dividing at least one of said upper and lower filtration chambers into non-communicating upper and lower portions.

3. A filtering device according to claim 2, wherein at least one laterally oriented dividing means is provided in each of said upper and lower filtration chambers, dividing each of said chambers into at least two non-communicating portions.

4. A filtration device according to claim 3, wherein each non-communicating portion of a filtration chamber has a volume of about 1 cubic foot.

5. A filtration device according to claim 1, wherein said filtration medium is gravel.

6. A filtration device according to claim 5, wherein said gravel has an average size of ¼ inches and is of desert origin.

7. A filtration device according to claim 1, wherein each said dividing means is formed of a resilient material having an outer diameter approximately equal to the inner diameter of said middle tubular member.

8. A filtration device according to claim 7, wherein said dividing means is formed of neoprene rubber.

9. A filtration device according to claim 2, wherein each said further dividing means is formed of a resilient material having an outer diameter approximately equal to the inner diameter of said middle tubular member.

10. A filtration device according to claim 9, wherein each said further dividing means is formed of neoprene rubber.

11. A filtration device according to claim 1, additionally comprising a means for releasing excessive pressure built up within said filtration device.

12. A system for treating water used in aquaculture, comprising:
    (a) a pre-filter for removing coarse contaminates from the water;
    (b) an aerator for aerating the water;
    (c) a filtration device comprising,
        an assembly of three concentric tubular members closed off at each end, in longitudinal upright position, the inner and middle tubular members being perforated over substantially their entire length to permit water flow therethrough, and the outer tubular member being substantially solid over its entire length;
        inlet means connected to said inner tubular member at each end thereof;
        outlet means connected to said outer tubular member;
        a filtration medium in the space between said middle tubular member and said inner tubular member defining a filtration chamber, the perforations of said inner and middle tubular members not passing said medium therethrough; and
        dividing means laterally dividing said inner tubular member into upper and lower non-communicating portions, and laterally dividing said filtration chamber into upper and lower non-communicating filtration chambers;
    (d) conduit means connecting said pre-filter, said aerator, and said filtration device;
    (e) means for dividing water in said conduit means between the inlet means at the upper end of the filtration device, and the inlet means at the lower end of the filtration device; and
    (f) means for pumping water through said conduit means, said pre-filter, said aerator and said filtration device.

13. A system according to claim 12, wherein said filtration device additionally comprises, in each of said upper and lower filtration chambers, a further latherally oriented dividing means for dividing each said chamber into at least two portions.

14. A system according to claim 13, wherein each of said portions has a volume of about 1 cubic foot.

15. A system according to claim 12, wherein said filtration medium is gravel.

16. A system according to claim 15, wherein said gravel has an average diameter of ¼ inch and is of desert origin.

17. A system according to claim 12, wherein said aerator is located between said pre-filter and said filtration device.

18. A system according to claim 12, wherein said pump is located upstream of said pre-filter.

19. A system according to claim 12, wherein said means for dividing the water in the conduit means comprises:
    (a) between said pre-filter and said filtration device, means splitting said conduit means into first and second legs, said first and second legs including first and second valve means, respectively, for controlling the flow of water through each leg;

(b) means for connecting said first leg, at the outlet of said first valve means, to inlet means located at one end of said inner tubular member of said filtration device;
(c) means for connecting said second leg, at the outlet of said second valve means, to the inlet means located at the other end of said inner tubular member of said filtration device.

20. A system according to claim 19, additionally comprising:
  (a) means splitting said first leg, at the outlet of said first valve means, into third and fourth legs, said third leg being connected to said inlet means at one end of said inner tubular member, and said fourth leg having a third valve means therein for controlling the flow of water therethrough;
  (b) means dividing said second leg, at the outlet of said second valve means, into fifth and sixth legs, said fifth leg being connected to said inlet means at the other end of said inner tubular member, and said sixth leg having a fourth valve means therein for controlling the flow of water therethrough;
  (c) fifth valve means connected to the outlet of said filtration device,
    whereby one portion of said filtration device can be backflushed by opening said second and third valve means and closing said first, fourth and fifth valve means, and whereby the other portion of said filtration device can be backflushed by opening said first and fourth valve means, and closing said second, third and fifth valve means.

21. A system according to claim 19, wherein said first and second valve means can be adjusted to provide approximately equal water flow through the upper and lower portions of said filtration chamber.

* * * * *